(12) United States Patent
Oltheten et al.

(10) Patent No.: US 9,096,325 B2
(45) Date of Patent: Aug. 4, 2015

(54) FLY-BY-WIRE ENGINE POWER CONTROL SYSTEM

(71) Applicant: Bell Helicopter Textron Inc., Fort Worth, TX (US)

(72) Inventors: Erik Oltheten, Azle, TX (US); James M. McCollough, Arlington, TX (US); Peter F. Scheidler, Arlington, TX (US); Jeffery S. Greenwood, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/082,615

(22) Filed: Nov. 18, 2013

(65) Prior Publication Data

US 2015/0142215 A1 May 21, 2015

(51) Int. Cl.
*B64D 31/14* (2006.01)
*B64D 31/04* (2006.01)

(52) U.S. Cl.
CPC ............... *B64D 31/14* (2013.01); *B64D 31/04* (2013.01)

(58) Field of Classification Search
USPC .............. 244/17.13, 194, 195, 196, 220, 221, 244/223, 228, 229, 230, 234, 236; 318/564
See application file for complete search history.

(56) References Cited

U.S. PATENT DOCUMENTS

| | | | |
|---|---|---|---|
| 4,688,443 A | 8/1987 | Fabre et al. | |
| 4,965,879 A * | 10/1990 | Fischer, Jr. | 701/3 |
| 5,039,037 A | 8/1991 | DeLuca | |
| 5,531,402 A * | 7/1996 | Dahl | 244/99.2 |
| 5,782,436 A * | 7/1998 | Pohling | 244/229 |
| 5,868,359 A * | 2/1999 | Cartmell et al. | 244/223 |
| 5,893,040 A | 4/1999 | Gunn et al. | |
| 5,900,710 A * | 5/1999 | Gautier et al. | 318/675 |
| 6,695,264 B2 | 2/2004 | Schaeffer et al. | |
| 6,880,784 B1 | 4/2005 | Wilkinson et al. | |
| 7,648,106 B2 * | 1/2010 | Granier et al. | 244/223 |
| 8,078,340 B2 | 12/2011 | Johnson et al. | |
| 8,104,720 B2 | 1/2012 | Hirvonen et al. | |
| 8,231,085 B2 * | 7/2012 | Cherepinsky | 244/223 |
| 8,469,317 B2 * | 6/2013 | Burroughs et al. | 244/229 |
| 8,690,101 B2 * | 4/2014 | Ahmad et al. | 244/99.4 |
| 2004/0078121 A1 | 4/2004 | Cartmell et al. | |

(Continued)

FOREIGN PATENT DOCUMENTS

EP 2597034 A1 5/2013

OTHER PUBLICATIONS

Official Action in related European Application No. 14150080.1, dated Jan. 30, 2015, 4 pages.

(Continued)

*Primary Examiner* — Timothy D Collins
*Assistant Examiner* — Jamie S Stehle
(74) *Attorney, Agent, or Firm* — Bell Helicopter Textron Inc.

(57) ABSTRACT

According to one embodiment, a method of managing pilot and copilot control of engine power in an aircraft includes receiving, from a first pilot input device, a first signal representative of a pilot selection of an increase power position or a decrease power position and receiving, from a second pilot input device, a second signal representative of a pilot selection of an increase power position or a decrease power position. One of the first signal and the second signal is prioritized. An aircraft engine is then instructed to change power output based on the prioritized signal.

15 Claims, 6 Drawing Sheets

(56) References Cited

U.S. PATENT DOCUMENTS

2008/0156939 A1* 7/2008 Hanlon et al. ............... 244/223
2009/0187324 A1 7/2009 Lu et al.
2010/0302074 A1 12/2010 Campagne et al.
2010/0305780 A1* 12/2010 Sataka ............................ 701/3
2011/0053691 A1 3/2011 Bryant et al.
2011/0108673 A1* 5/2011 Antraygue ................... 244/228
2011/0173988 A1 7/2011 Sweet et al.
2012/0025031 A1* 2/2012 Stachniak et al. ............ 244/223

OTHER PUBLICATIONS

Official Action in related European Application No. 14150080.1, dated Jul. 4, 2014, 6 pages.

Search Report in related European Application No. 14150080.1, dated Jun. 20, 2014, 3 pages.

* cited by examiner

FLY-BY-WIRE ENGINE POWER CONTROL SYSTEM

TECHNICAL FIELD

This invention relates generally to pilot flight controls, and more particularly, to a fly-by-wire engine power control system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide a fly-by-wire throttle that may used in conjunction with a flight control system, such as a fly-by-wire flight control system or a conventional flight control system with mechanical linkages. A technical advantage of one embodiment may include the capability to provide a curved control stick having a throttle grip. A technical advantage of one embodiment may include the capability to resolve conflicting flight control signals between two fly-by-wire throttles.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
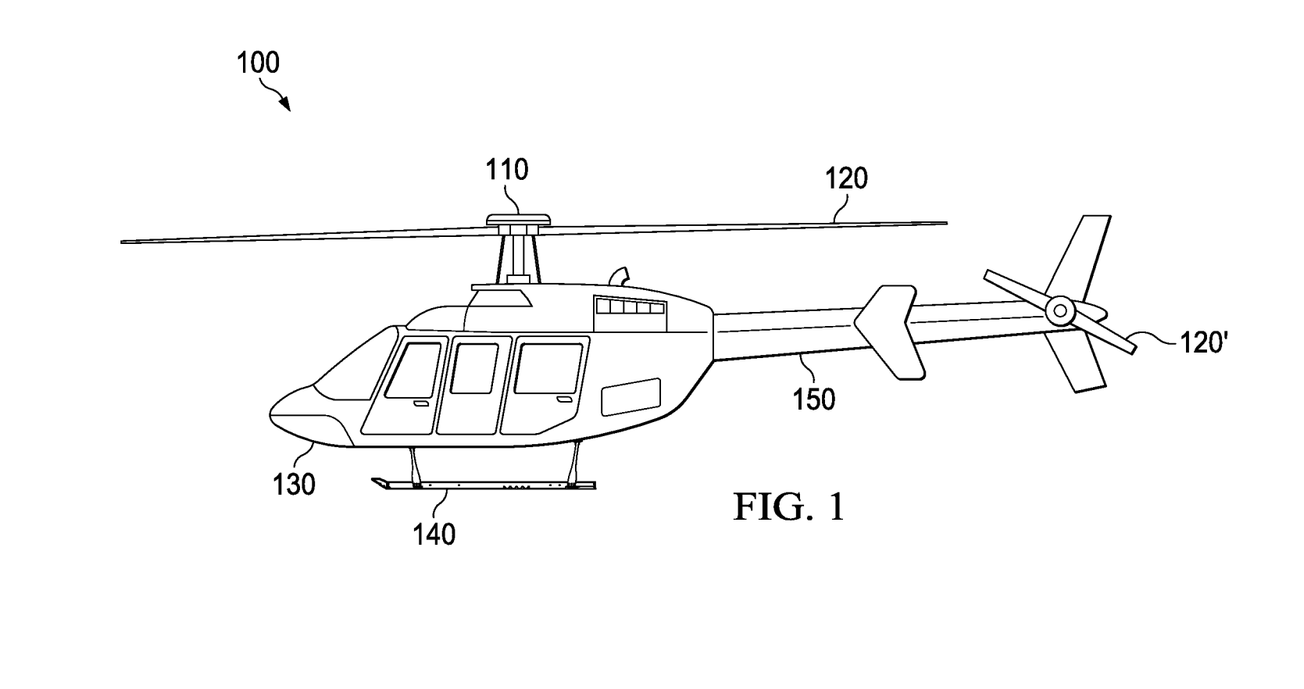
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Thrust generated by rotor system 110 may be varied in several ways. For example, as stated above, adjusting the pitch of each blade 120 may change the thrust generated by rotor system 110. As another example, changing the rotation speed of blades 120 may change the thrust generated by rotor system 110. The rotation speed of blades 120 may be changed, for example, by changing the power output of the one or more engines in mechanical communication with rotor system 110. As used throughout, changing the amount of thrust or power generated by a rotor system such as rotor system 110 may also refer to changes that effect thrust or power generation, such as changes in blade speed.

A pilot may change the power generated by an engine by adjusting a "throttle" or other pilot input device. For example, in some aircraft, a pilot may push/pull a throttle lever that is mechanically coupled via a series of linkages to an engine control unit located proximate to the engine.

Mechanical linkages, however, impose several design constraints on aircraft manufacturers. For example, teachings of certain embodiments recognize that pilot control of some aircraft may be improved by incorporating a "throttle" control into the grip of a control "stick" (such as the collective control stick in a rotorcraft). Incorporating the throttle into the grip of a control stick, for example, may allow the pilot to quickly adjust engine power while still maintaining control of the stick.

Some control sticks, however, have an at least partially-curved shaft that may restrict the ability to mechanically link a throttle grip to the engine control units. Teachings of certain embodiments recognize that at least partially-curved control sticks may allow the control stick to fit into a smaller space and still provide an appropriate range of motion to the pilot. This curvature, however, may prevent mechanical communication between a throttle grip and the engine control unit using traditional straight linkages. Although alternative mechanical solutions, such as push cables, may be installed inside a curved control stick, such solutions may not satisfy reliability requirements for an aircraft.

Accordingly, teachings of certain embodiments recognize the capability to provide a fly-by-wire engine power control system that may eliminate the need for some traditional mechanical linkages. For example, in some embodiments, a throttle grip may be provided at one end of a curved control stick, and an electrical transmission wire may be disposed within the curved control stick and configured to communicate control signals from the throttle grip to the engine control unit. Teachings of certain embodiments also recognize that providing a fly-by-wire power control system may reduce aircraft weight and installation costs because providing engine power control wire between the throttle and the engine may be lighter and easier than providing mechanical linkages between the throttle and the engine.

Many aircraft include two sets of flight controls to accommodate a pilot and a co-pilot. Teachings of certain embodiments recognize the capability to accommodate engine power control inputs from two pilots and resolve conflicts between inconsistent inputs without mechanically coupling the pilot and co-pilot input devices.

Figure 2A:
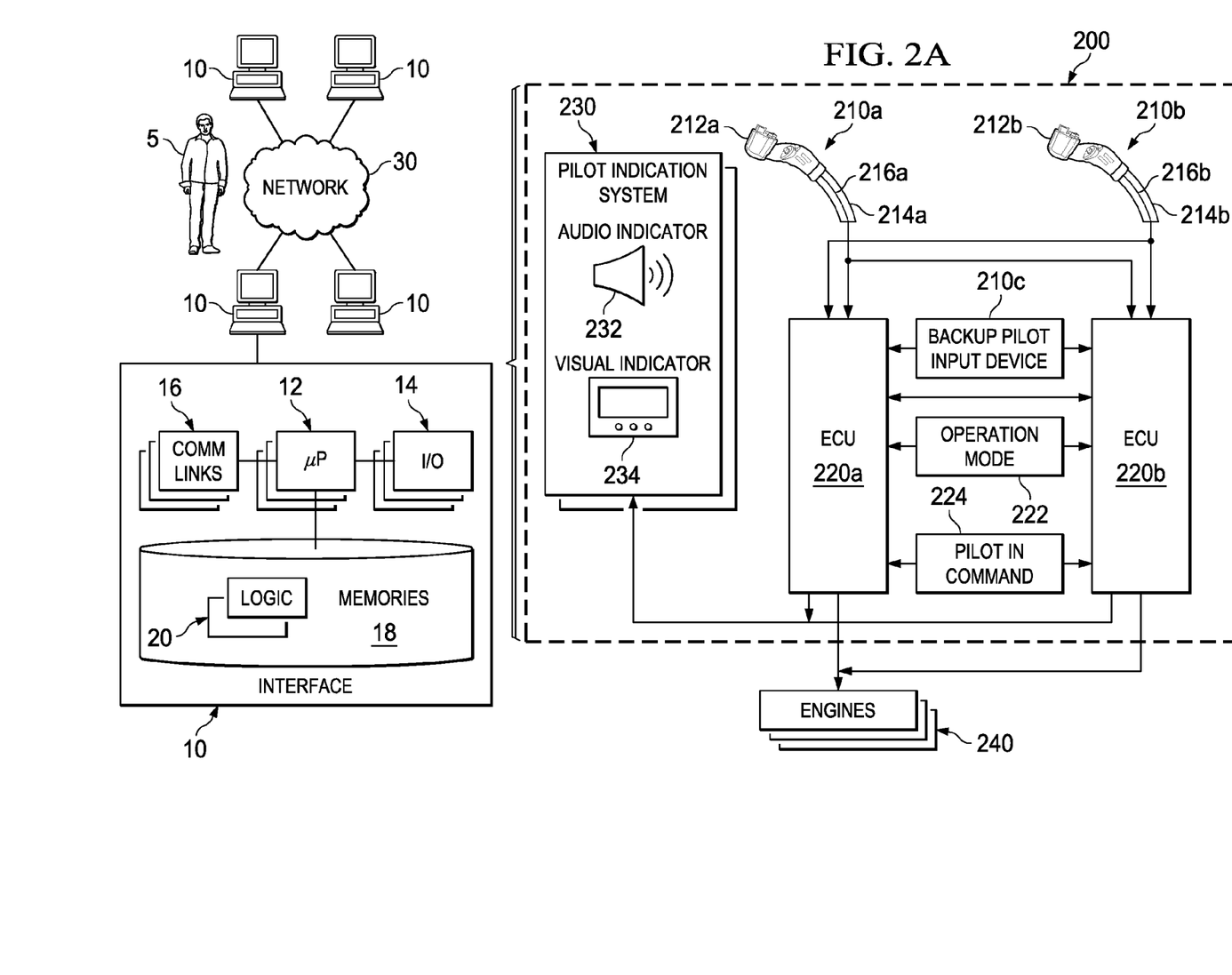
FIG. 2A shows an engine control system 200 according to one example embodiment that may be incorporated into the rotorcraft of FIG. 1 or another aircraft or vehicle.

FIG. 2A shows an engine control system 200 according to one example embodiment. In the example of FIG. 2A, engine control system 200 features input devices 210 and 210b, engine control units (ECUs) 220a and 220b, pilot indication systems 230, and engines 240, that may be implemented at least partially by one or more computer systems 10. All, some, or none of the components of system 200 may be located on or near rotorcraft 100 (or another aircraft). In some embodiments, system 200 may be in communication with or incorporated into a fly-by-wire flight control system.

Users 5 may access system 200 through computer systems 10. For example, in some embodiments, users 5 may request a change in engine power using input devices 210a and 210b. In general, users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In the example of FIG. 2A, input device 210a features a throttle 212a, a curved control stick 214a, and an electrical transmission wire 216a disposed within the curved control stick 214a. Similarly, input device 210b features a throttle 212b, a curved control stick 214b, and an electrical transmission wire 216b disposed within the curved control stick 214b.

In some embodiments, throttles 212a and 212b may represent twist-grip hand throttles. In some embodiments, twisting a twist-grip hand throttle in a first direction may transmit a signal to increase engine power, and twisting the twist-grip hand throttle in the opposite direction may transmit a signal to decrease engine power. In this example, twist-grip positions in the first direction may represent increase positions, and twist-grip positions in the opposite direction may represent decrease positions. In some embodiments, maintaining the twist-grip in a neutral (untwisted) position may result in an instruction to maintain engine power at its current level or, alternatively, may result in no signal because no change to engine power has been instructed by the pilot.

In some embodiments, each throttle 212a and 212b may include a plurality of detents. For example, a twist-grip throttle may include multiple detents in the increase direction, each detent representing a different increase position. In this example, twisting the twist-grip throttle past successive detents may result in greater increases to engine power. In another example embodiment, the neutral position is represented by a detent.

In one example embodiment, each twist-grip throttle includes a spring mechanism that returns the grip back to a neutral position. In this example, a pilot may twist the grip to an increase or decrease position, release the grip, and allow the spring mechanism to return the grip back to the neutral position.

In another example embodiment, the neutral position moves during operation of the input device. For example, a twist grip throttle may include multiple detents or other positions along a twisting path. For example, a twist grip may be adjustable among a first position representing a decrease position, a second position representing a neutral position, a third position representing an increase position, and a fourth position. In this example, a pilot may request an increase in engine power by twisting the grip from the second position to the third position. After the twist grip is moved to the third position and an increase-engine signal is transmitted towards the engine control unit, the third position may now represent the neutral position, the second position may now represent the decrease position, and the fourth position may now represent the increase position. Thus, in this example, the "neutral" position may change during operation rather than stay in a fixed physical position.

Figure 2B:
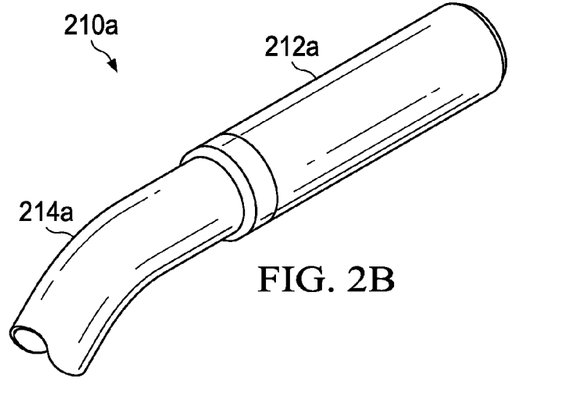
FIGS. 2B, 2C, 2D, and 2E show an input device 210a of the engine control system 200 of FIG. 2A according to one example embodiment.
Figure 2C:
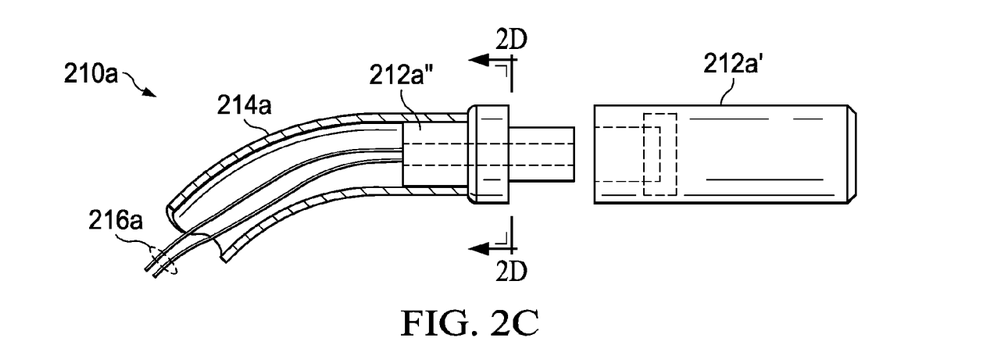
Figures 2D, 2E:
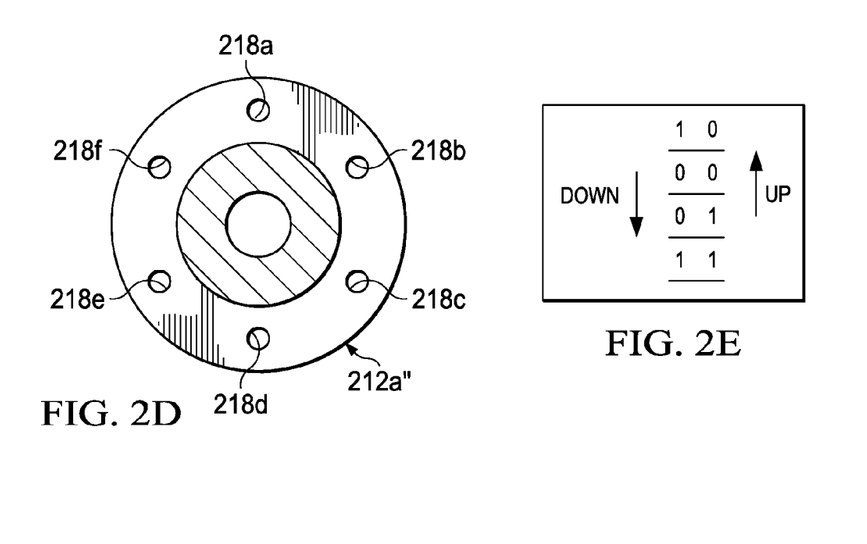

FIGS. 2B, 2C, 2D, and 2E show an input device 210a according to one example embodiment. FIG. 2B shows a perspective view of input device 210a, FIG. 2C shows a cross-section view of the throttle 212a and curved control stick 214a, FIG. 2D shows a crossection view of the detents of throttle 212a, and FIG. 2E shows a four-state binary scale indicating the throttle setting of throttle 212a.

In the example of FIGS. 2B, 2C, and 2D, throttle 212a features a plug portion 212a' and a spool portion 212a". Rotary motion is allowed between the plug portion 212a' and the spool portion 212a". The relative motion between the plug portion 212a' and the spool portion 212a" changes a series of ones and zeroes on the four-state binary scale shown in FIG. 2E, which are arranged to indicate that the rotary motion is either up or down. Teachings of certain embodiments recognize that more or fewer states indicating changes in the throttle position may be used. For example, teachings of certain embodiments recognize that a throttle with more than four binary states may be able to identify both a direction and magnitude of a change in throttle setting based on the change in throttle state (e.g., moving from a first binary state to a third binary state, and thus skipping the second binary state, may indicate both the direction and the magnitude of the change in throttle setting).

In the example of FIG. 2D, throttle 212a features six detents 218a-218f. In this example, detents 218a-218f are positioned 60 degrees apart to serve as throttle stopping points. Teachings of certain embodiments recognize that 60 degrees may represent a comfortable distance to rotate the wrist without requiring a grip change, although teachings of certain embodiments also recognize that the number of detents could be larger or smaller to change the desired rotation angle.

In operation, according to one example embodiment, the throttle 212a of FIGS. 2B-2E would not provide an output as long as the throttle setting remained constant. Turning plug portion 212a' to a different detent, however, may change the binary output (e.g., from 0-0 to 0-1). This change in binary output may indicate the direction of the throttle setting change (e.g., increase or decrease). The power output may accordingly be increased or decreased based on this change in binary output.

Returning to the example of FIG. 2A, each input device 210a and 210b features a curved control stick and a transmission line configured to transmit inputs from each throttle to the engine control units 220a and 220b. Embodiments of input devices 210a and 210b may include more or fewer components. For example, in some embodiments, input devices 210a and 210b may feature devices that measure twisting movement of the twist-grips and transmits signals through the transmission lines representative of the direction and magnitude of twisting. Such devices may include, for example, rotary variable differential transformers (RVDTs) that measure angular displacement.

In some embodiments, ECUs 220a and 220b may instruct engines 230 to increase or decrease power output in response to signals received from input devices 210a and 210b. In one example embodiment, ECUs 220a and 220b may include a digital engine control units, such as a full authority digital engine control (FADEC). ECUs 220a and 220b may be associated with a variety of actuators and other devices configured to change power output of engines 240. In some embodiments, ECUs 220a and 220b may include equipment configured to convert signals received from input devices 210a and 210b into signals recognizable by a FADEC or other engine control equipment.

In the example of FIG. 2A, two ECUs 220a and 220b are shown. In some embodiments, two ECUs 220a and 220b may change the power output of one or more engines 240. For example, in some embodiments, ECUs 220a and 220b may compare signals and identify errors if, for example, instructions received by ECU 220a do not match instructions received by ECU 220b.

In some embodiments, ECUs 220a and 220b may have multiple modes of operation. For example, in a first example mode of operation, an instruction to increase power output may represent an instruction to increase power output to a predetermined flight mode, and an instruction to decrease power output may represent an instruction to decrease power output to a predetermined idle mode. In this example mode of operation, the pilot may transition the aircraft into flight mode my positioning grip 212a to an increase position or may transition the aircraft into idle mode by positioning grip 212a to a decrease position.

In a second example mode of operation, an instruction to increase power output may represent an instruction to increase power output (or a value functionally associated with power output, such as aircraft speed) by a predetermined amount, and an instruction to decrease power output may represent an instruction to decrease power output by a predetermined amount. In this example mode of operation, the pilot may incrementally change power output by repositioning grip 212a to an increase position or a decrease position. In some embodiments, the pilot may hold grip 212a in an increase position or a decrease position for an extended period of time to change the power output by a larger amount.

In some embodiments, the pilot may switch between multiple modes of operation, such as between the first and second example modes of operations described above. In the example of FIG. 2A, a pilot may choose a mode of operation using operation mode selector 222. In one example embodiment, operation mode selector 222 may represent a dial selector with positions corresponding to each mode of operation.

Also in some embodiments, the pilot in command may be selected using pilot-in-command selector 224. Pilot-in-command selector 224 may allow the pilot input device corresponding to a flight instructor (e.g., pilot input device 210a) to overrule any inputs provided through the pilot input device corresponding to a student (e.g., pilot input device 210b). In this manner, pilot-in-command selector 224 may allow the flight instructor to take control of the aircraft without allowing the student's flight control inputs to cancel out those inputs provided by the flight instructor.

The example of FIG. 2A also features a backup pilot input device 210c (which may also be referred to as a backup throttle). Teachings of certain embodiments recognize that a pilot may engage the backup pilot input device 210c in the event of a failure by one or more primary pilot input devices 210a and 210b. In some embodiments, engaging backup pilot input device 210c may disengage primary pilot input devices 210a and 210b such that primary pilot input devices 210a and 210b cannot change the power output of engines 240. In one example embodiment, backup pilot input device 210c may operate in a single mode of operation, such as the first example mode of operation described above.

Pilot indication systems 230 may alert the pilots to instructed changes in power output and/or actual changes in power output. Teachings of certain embodiments recognize that alerting the pilots to changes in power output may help the pilots identify incorrect and/or inadvertent power output changes. For example, if a failure in input device 210a caused input device 210a and transmit an incorrect instruction to change power output, teachings of certain embodiments recognize that pilot indication systems 230 may identify the power output change to the pilots and enable the pilots to take corrective action (e.g., engage the backup pilot input device 210c). In another example scenario, a student pilot may be flying with an instructor, and the student pilot may provide an incorrect instruction to change engine power. In this example scenario, pilot indication systems 230 may alert the instructor to the power output change, and the instructor may take corrective action (e.g., changing the power output to the previous level).

In some embodiments, pilot indication systems 230 may include an audio indicator 232. Audio indicator 232 may provide an audio indication of a power output change, such as by playing one or more audible tones.

Figure 3A:
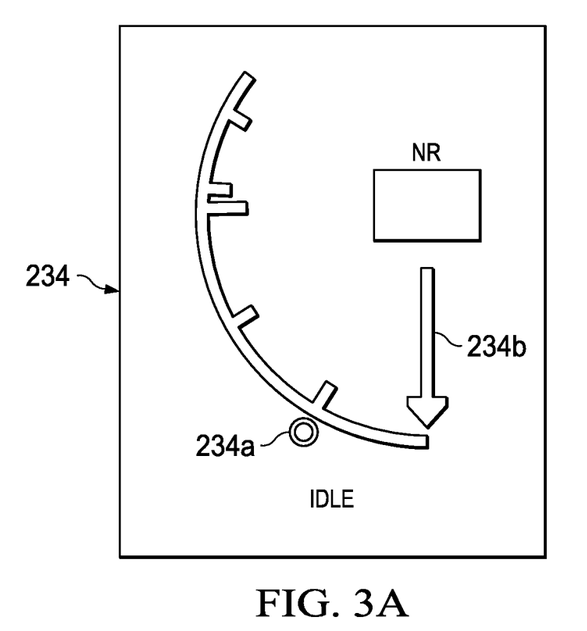
FIGS. 3A and 3B show a visual indicator of the engine control system of FIG. 2A according to one example embodiment.
Figure 3B:
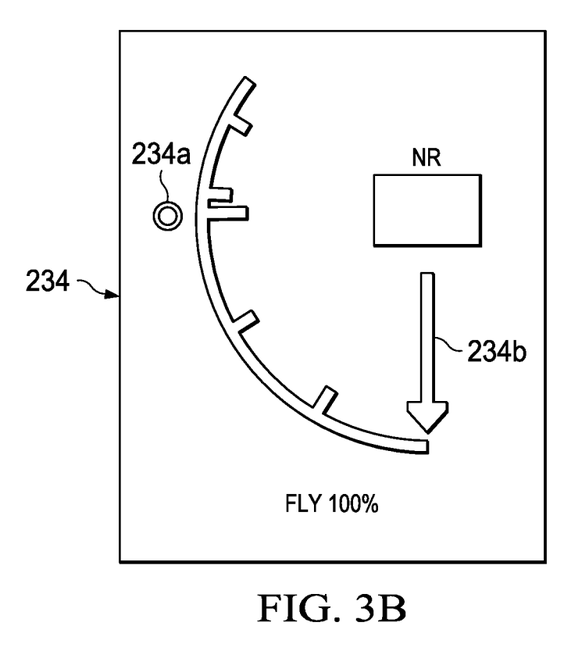

In some embodiments, pilot indication systems 230 may include a visual indicator 234. For example, FIGS. 3A and 3B show a visual indicator 234 according to one example embodiment. In the example of FIGS. 3A and 3B, visual indicator 234 features an instructed power indicator 234a and an actual power indicator 234b. Changing the instructed may change the position of instructed power indicator 234a. For example, in the first example mode of operation, the location of instructed power indicator 234a may change between an idle location and a flight location. In the second example mode of operation, the location of instructed power indicator 234a may move incrementally with each instructed change to the power output.

In the example of FIG. 3A, instructed power indicator 234a suggests that engines 240 have been instructed to idle, and actual power indicator 234b suggests engines 240 are idling at a power level below the instructed power level. In the example of FIG. 3B, the instructed power indicator 234a indicates that engines 240 have been instructed to increase power output to a flight mode, but actual power indicator 234b indicates that engines 240 have not increased their power output as instructed.

Returning to the example of FIG. 2A, providing two input devices 210a and 210b may allow a pilot and a copilot to provide different inputs to ECUs 220a and 220b. As will be explained in greater detail below, of certain embodiments recognize the capability to resolve conflicts between inputs provided by the pilot and inputs provided by the co-pilot.

Figure 4:
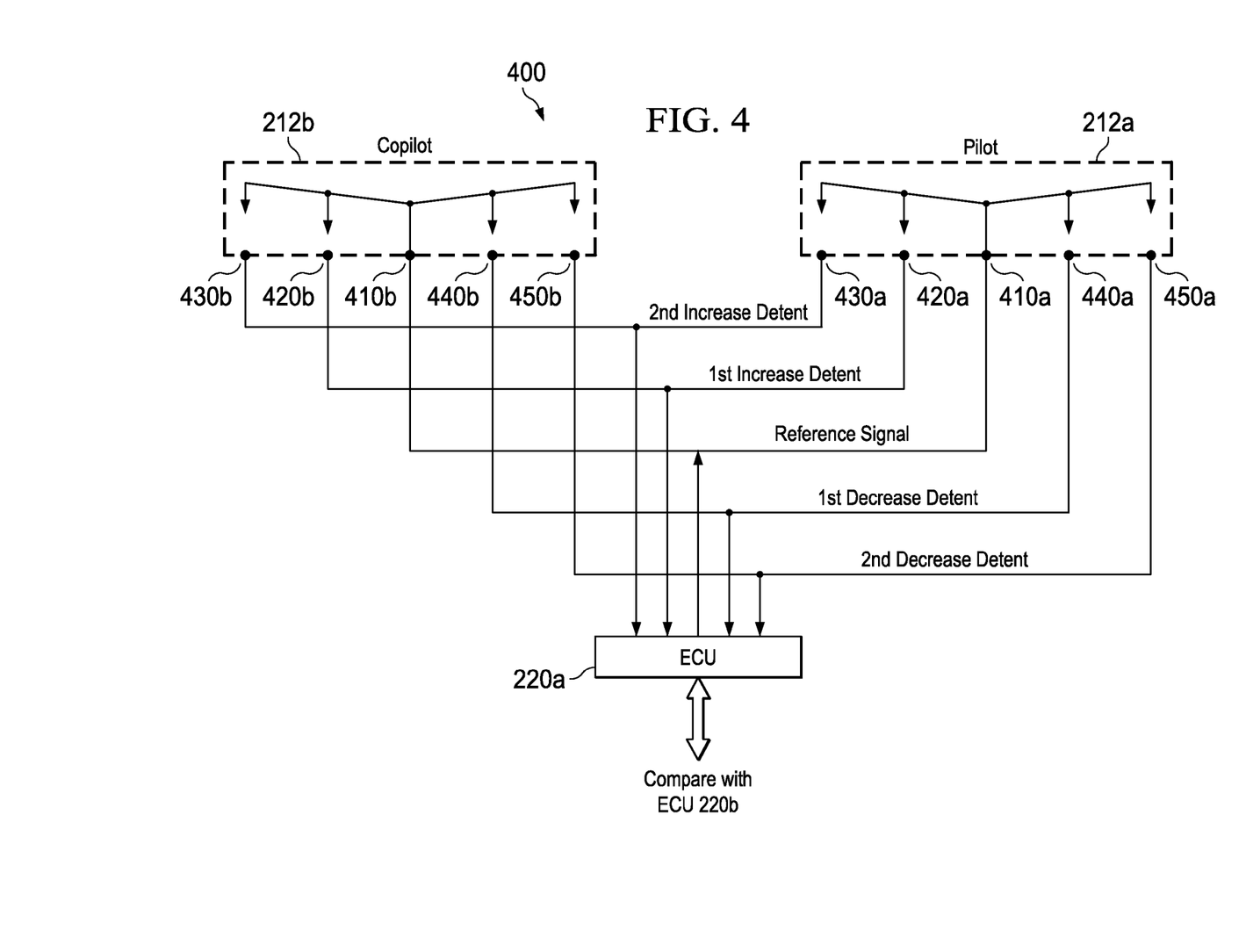
FIG. 4 shows an example configuration of the engine control system of FIG. 2A according to one example embodiment.

FIG. 4 shows an example configuration 400 of engine control system 200 according to one example embodiment. In the example of FIG. 4, the pilot input device 212a includes five detents: a neutral detent 410a, a first increase detent 420a, a second increase detent 430a, a first decrease detent 440a, and a second decrease detent 450a. Similarly, the co-pilot input device 212b includes five detents: a neutral detent 410b, a first increase detent 420b, a second increase detent 430b, a first decrease detent 440b, and a second decrease detent 450b.

In the example of FIG. 4, each neutral detent 410a and 410b may represent a neutral position in which no change to power output is requested. Each first increase detent 420a and 420b may represent a first increase position that, when selected, causes pilot input devices 210a or co-pilot input device 210b to instruct ECUs 220a and/or 220b to slowly increase power output to a flight mode of operation. Each second increase detent 430a and 430b may represent a second increase position that, when selected, causes pilot input devices 210a or co-pilot input device 210b to instruct ECUs 220a and/or 220b to quickly increase power output to the flight mode of operation (e.g., a high-rate, torque-limited acceleration to the flight mode of operation). Each first decrease detent 440a and 440b may represent a first decrease position that, when selected, causes pilot input devices 210a or co-pilot input device 210b to instruct ECUs 220a and/or 220b to slowly decrease power output to an idle mode of operation. Each second decrease detent 430a and 430b may represent a second decrease position that, when selected, causes pilot input devices 210a or co-pilot input device 210b to instruct ECUs 220a and/or 220b to quickly decrease power output to the idle mode of operation (e.g., emergency chop).

In some scenarios, the pilot may provide different instructions to change power output than the co-pilot. Teachings of certain embodiments recognize that ECUs 220a and 220b may resolve conflicts between different instructions by prioritizing some instructions and ignoring others. For example, if ECU 220a determines than an instruction received from pilot input device 210a conflicts with an instruction received from pilot input device 210b, ECU 220a may prioritize one instruction over another and instruct engine 240 to change the power output based on the prioritized instruction.

Teachings of certain embodiments recognize the ability to prioritize signals based on the type or content of the signals received. For example, in some embodiments, ECUs 220a and 220b may prioritize power output increase instructions over power output decrease instructions. In another example embodiment, ECUs 220a and 220b may prioritize smaller power output changes over larger power output changes. In yet another example embodiment, ECUs 220a and 220b may prioritize faster power output changes over slower power output changes (e.g., a fast to idle instruction may be prioritized over a slow to idle instruction). In the example of FIG. 4, the second increase position (fast to fly) may have the highest priority, followed by the second decrease position (chop to idle), the first increase position (slow to fly), the first decrease position (slow to idle), and the neutral position.

Figure 5:
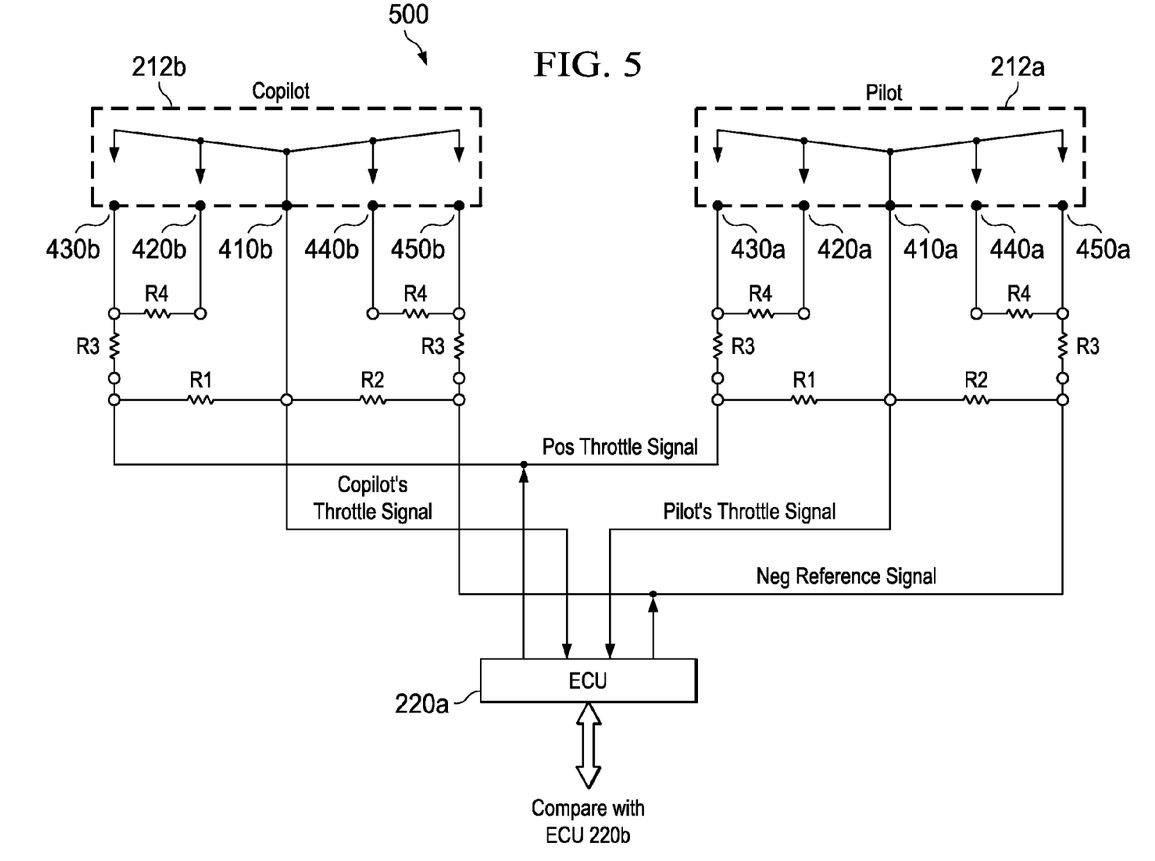
FIG. 5 shows a wiring diagram 500 of the example configuration of FIG. 4 according to one example embodiment.

FIG. 5 shows a wiring diagram 500 of the example configuration 400 of engine control system 200 according to one example embodiment. Teachings of certain embodiments recognize that the wiring configuration of FIG. 5 may reduce the wiring required as compared to, for example, the connections shown in FIG. 4.

In the example of FIG. 5, ECU 220a provides a positive reference signal and a negative reference signal. In one example configuration, the positive reference signal may be 15 volts, and the negative reference signal may be −15 volts. The example of FIG. 5 also features four different resistor values for each input device 210a and 210b. In one example configuration, R1 may be 10,000 ohms, R2 may be 15,000 ohms, R3 may be 2,700 ohms, and R4 may be 5,000 ohms.

In operation, according to one example embodiment, selecting a detent position using grip 212ab creates a signal path from input device 210a to ECU 220a. The ECU 220a may identify the selected detent position based on the voltage measured on the signal path from input device 210a to ECU 220a. Returning to the previous example, selecting neutral detent 410a may result a measurement of approximately 3 volts; selecting the first increase detent 420a may result in a measurement of approximately 8.26 volts; selecting the second increase detent 430a may result in a measurement of approximately 11.28 volts; selecting the first decrease detent 440a may result in a measurement of approximately −4.88 volts; and selecting the second decrease detent 450a may result in a measurement of approximately −9.41 volts.

In some embodiments, thresholds may be established to determine the instructed power output change from the measured voltage. Returning to the previous example, thresholds could be established as follows: greater than 13.1 volts indicates an invalid result (e.g., the negative reference wire is open); between 9.8 and 13.1 volts indicates a fast acceleration to flight mode; between 5.6 and 9.8 volts indicates a slow acceleration to flight mode; between 1.0 and 5.6 volts indicates a neutral position; between −1.0 and 1.0 volts indicates an invalid result (e.g., the signal line is open); between −7.1 volts and −1.0 volts indicates a slow decrease to idle; between −12.2 and −7.1 volts indicates an emergency chop to idle; and less than −12.2 volts indicates an invalid result (e.g., the positive reference wire is open).

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body;
a power train coupled to the body and comprising an engine and a drive shaft coupled to the engine;
a main rotor system coupled to the power train, the main rotor system comprising at least one main rotor blade;
a pilot input device disposed within the body and comprising:
an engine power throttle adjustable among a neutral position, an increase position, and a decrease position, the pilot input device configured to transmit a first signal in response to a pilot selection of the increase position and transmit a second signal in response to a pilot selection of the decrease position;
a shaft coupling the engine power throttle to the body of the rotorcraft; and
a transmission wire disposed within the shaft and configured to electrically communicate signals from the engine power throttle to an engine control unit; and
the engine control unit in electrical communication with the engine power throttle and operable to:
instruct the engine to increase power output in response to receipt of the first signal via the transmission wire; and
instruct the engine to decrease power output in response to receipt of the second signal via the transmission wire.

2. The rotorcraft of claim 1, further comprising a second engine power throttle disposed within the body, the engine control unit configured to:
receive a first engine power throttle signal from the power throttle and a second engine power throttle signal from the second engine power throttle, the first engine power throttle signal comprising one of the first signal and the second signal;
determine whether the first engine power throttle signal received from the engine power throttle is inconsistent with the second engine power throttle signal received from the second engine power throttle;
prioritize one signal from among the first engine power throttle signal received from the engine power throttle and the second engine power throttle signal received from the second engine power throttle; and
instruct the engine to change power output based on the prioritized signal.

3. The rotorcraft of claim 2, wherein the prioritizing one signal from among the first engine power throttle signal received from the engine power throttle and the second engine power throttle signal received from the second engine power throttle comprises prioritizing signals representative of pilot selection of an increase position over signals representative of pilot selection of a decrease position.

4. The rotorcraft of claim 2, wherein prioritizing one signal from among the signal received from the engine power throttle and the signal received from the second engine power throttle comprises prioritizing signals representative of smaller power changes over signals representative of larger power changes.

5. The rotorcraft of claim 1, further comprising a backup engine power throttle, the backup engine power throttle configured to, when engaged by a pilot, to instruct the engine control unit to operate the engine in a flight mode or an idle mode and ignore signals received from the engine power throttle.

6. The rotorcraft of claim 1, the engine power throttle further comprising a spring device operable to reposition the engine power throttle from the increase position or the decrease position back to the neutral position.

7. The rotorcraft of claim 1, wherein:
the engine power throttle is adjustable among a plurality of positions comprising a first position, a second position, a third position, and a fourth position, the first position representing the decrease position prior to a pilot selection, the second position representing the neutral position prior to the pilot selection, and the third position representing the increase position prior to the pilot selection;
the pilot selection of the increase position comprises adjustment of the engine power throttle from selection of the second position to selection of the third position; and
subsequent to the pilot selection, the second position represents the decrease position, the third position represents the neutral position, and the fourth position represents the increase position.

8. The rotorcraft of claim 1, further comprising an audio device configured to produce an audio indication that the engine has been instructed to increase or decrease power.

9. The rotorcraft of claim 1, further comprising a display device configured to produce a visual indication that the engine has been instructed to increase or decrease power.

10. The rotorcraft of claim 1, the engine power throttle comprising a twist grip adjustable among the neutral position, the increase position, and the decrease position.

11. The rotorcraft of claim 1, wherein:
the engine control unit is operable to instruct the engine to increase power output to a flight mode of operation in response to receipt of the first signal; and
the engine control unit is operable to instruct the engine to decrease power output to an idle mode of operation in response to receipt of the second signal.

12. The rotorcraft of claim 1, wherein:
the engine control unit is operable to instruct the engine to increase power output by a first predetermined value in response to receipt of the first signal; and
the engine control unit is operable to instruct the engine to decrease power output by a second predetermined value in response to receipt of the second signal.

13. The rotorcraft of claim 1, further comprising an operation mode switch disposed within the body and comprising a first mode position representative of a first operation mode and a second mode position representative of a second operation mode, wherein:
the engine control unit is operable to instruct the engine to increase power output to a flight mode of operation in response to receipt of the first signal in the first operation mode;
the engine control unit is operable to instruct the engine to decrease power output to an idle mode of operation in response to receipt of the second signal in the first operation mode;
the engine control unit is operable to instruct the engine to increase power output by a first value in response to receipt of the first signal in the second operation mode; and
the engine control unit is operable to instruct the engine to decrease power output by a second value in response to receipt of the second signal in the second operation mode.

14. The rotorcraft of claim 1, wherein the shaft is a collective control stick.

15. The rotorcraft of claim 1, wherein the shaft comprises a curved shaft portion.

* * * * *